Aug. 26, 1924.  1,506,685
E. R. STEMMANN
SANITARY MILK AND CREAM CAN COVER
Filed July 28, 1923
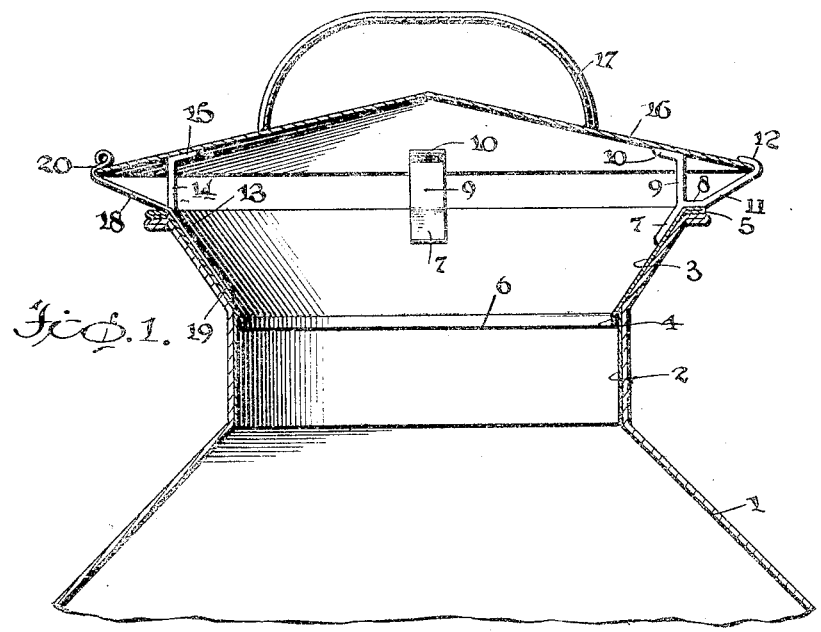
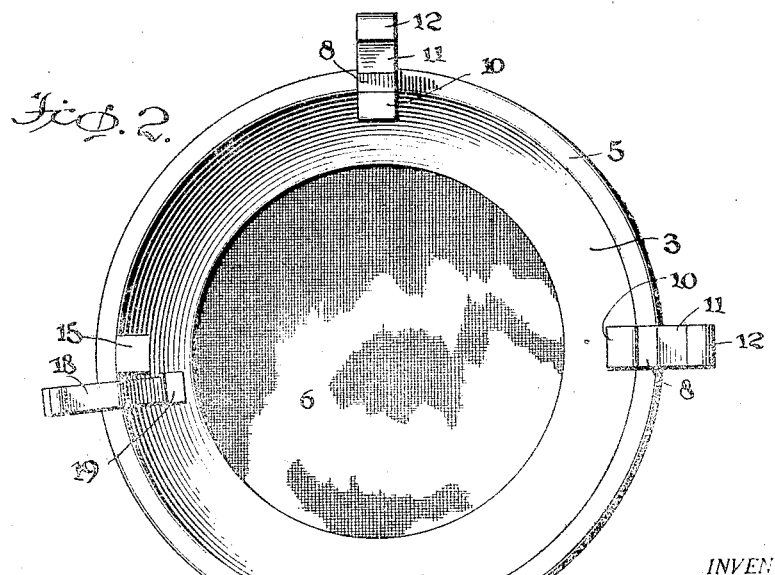
INVENTOR.
Ervin R. Stemmann
BY
Geo. Kimmel
ATTORNEY.

Patented Aug. 26, 1924.

1,506,685

UNITED STATES PATENT OFFICE.

ERVIN R. STEMMANN, OF GOODHUE, MINNESOTA.

SANITARY MILK AND CREAM CAN COVER.

Application filed July 28, 1923. Serial No. 654,430.

*To all whom it may concern:*

Be it known that I, ERVIN R. STEMMANN, a citizen of the United States, residing at Goodhue, in the county of Goodhue and State of Minnesota, have invented certain new and useful Improvements in Sanitary Milk and Cream Can Covers, of which the following is a specification.

This invention relates to milk can covers, and has for its object the provision, in a manner as hereinafter set forth, of a cover, adapted to be partly inserted into the neck of a milk can and having means allowing for the free circulation of air over the surface of the milk, and having further means for preventing dirt and insects from reaching the milk.

Another object of this invention, is the provision, in a manner as hereinafter set forth, of a milk can cover which easily and quickly applied to the mouth of a milk can, will be strong, durable and inexpensive to manufacture.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawing:—

Fig. 1 is a vertical transverse sectional view of the device embodying the invention, together with a section of the upper portion of a part of a milk can to which it is applied.

Fig. 2 is a top plan view of the device with the upper portion removed.

Referring now to the drawing in detail, wherein like numerals of reference indicate corresponding parts in both of the views, 1 indicates a portion of a milk can at its top.

The body portion of the device embodying this invention comprises, a vertical walled annular lower part 2, which is adapted to fit into the neck of a milk can, and a conoidal shaped upper part 3, having a narrow annular depending portion 4, at its lower end, of less external diameter than the internal diameter of the part 2, into which it extends. The upper edge of 3, is bent out and the edge turned under against itself to form the flange 5. This part 3, and the flange 5, bear against the inner surface and flange of the lip of the can as shown.

Across the member 2, at its joinder with 3, is stretched a copper gauze 6, the edges of which are soldered or otherwise secured in the space between the depending portion 4, and the surface of the part 2.

Equidistantly spaced about and extending above the upper edge of the part 3, are four top supporting members, three of which have an obtusely angled base portion comprising a long arm 7, which rests upon the inner surface of 3, and a short arm 8, which rests upon the flange 5. At the angle of these two members there is a vertical post 9, terminating in an inwardly and upwardly extending arm 10. Continuing outwardly and upwardly at an angle from the short arm 8, is an extension 11, which has its end turned back at an upwardly inclined angle forming the hook 12. This member 12, is parallel with, but removed from the plane of, the arm 10.

The fourth member is of the same structure as 7, 9 and 10, it having a foot member 13, which rests upon the sloping surface of 3, the upright 14, and the inwardly extending arm 15.

Supported upon the arms 10, is a cone shaped top 16, of greater circumference than the body portion, the edge of which is held beneath the hook members 12. A handle 17, is provided for the top.

The top is removably held in position by a spring clip 18, one end of which is held beneath a loop 19, alongside of the support 14, the other end extending upwardly and outwardly and terminating in a back turned hook 20, which is adapted to snap over the edge of the top 16, as shown.

When it is desired to remove the top 16, the spring hook 20, is pressed down out of engagement with the edge of the top, and the same drawn over the hook 20, on the arms 10 and 15 until the edge of the top is free of the hooks 12, when the same may be lifted from the supports.

From the foregoing description it will be seen that a covering device is provided for a milk can having a top spaced from the lip of the can, to allow a circulation of air thereunder and across the top of the body of milk, assisting in cooling it, and preventing it from souring as it would be likely to do if closely covered while warm.

Entrance of dirt and insects is prevented, by the gauze screen supported in the neck, by the lower portion of the cover.

These devices may be made permanent substitutes for the old covers, and when desirous of filling the can the top can be removed, as described above, and the milk poured in through the straining screen 6.

Having thus described the invention, what is claimed as new is:

1. A milk can cover comprising a body portion adapted to be fitted into the neck of a milk can, said body portion including a lower annular part and an upper conoidal shaped part having an annular lower end of slightly less diameter than the internal diameter of said annular part and extended thereinto, said upper part further including a laterally extending flange at its top, a foraminous body transversely of said body portion at the joinder of said parts having its edge upturned and secured between said annular lower end and said lower annular part, and vertically extending means carried by said upper part for removably supporting a top above the body portion.

2. A milk can cover including a foraminous strainer element comprising, a body portion adapted to be fitted into the neck of a milk can, vertically extending supports carried by said body portion at its upper edge, outwardly and upwardly extending arms adjacent certain of said supports and terminating in an inturned hook, a lid of greater circumference than said body portion removably carried upon said supports and engaged by said hooks, and a catch carried by said body portion for engaging said lid for retaining the same in position.

3. A milk can cover comprising, a body portion adapted to be fitted into the neck of a milk can, vertically extending supports carried by said body portion at its upper edge, certain of said supports having formed integral therewith an outwardly and upwardly extending arm terminating in an inturned inclined hook, said hook being parallel with and in a higher plane than the top surface of its adjacent support, a lid removably carried upon said supports and engaged over its edge and upon its top surface by said hooks, and resilient means engaging said lid to retain the same in position upon said supports.

In testimony whereof, I affix my signature hereto.

ERVIN R. STEMMANN.